US010502837B1

(12) United States Patent
Xie et al.

(10) Patent No.: US 10,502,837 B1
(45) Date of Patent: Dec. 10, 2019

(54) APPARATUSES AND METHODS FOR MEASURING POSITION AND VELOCITY

(71) Applicant: Marvell International Ltd., Hamilton (BM)

(72) Inventors: Peng Xie, Milpitas, CA (US); Zhike Jia, Fremont, CA (US); Paul A. Lambert, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 406 days.

(21) Appl. No.: 15/460,676

(22) Filed: Mar. 16, 2017

Related U.S. Application Data

(60) Provisional application No. 62/369,559, filed on Aug. 1, 2016, provisional application No. 62/337,851, filed on May 17, 2016, provisional application No. 62/314,936, filed on Mar. 29, 2016.

(51) Int. Cl.
| | |
|---|---|
| *G01S 19/22* | (2010.01) |
| *G01S 19/26* | (2010.01) |
| *G01S 19/42* | (2010.01) |
| *G01S 19/52* | (2010.01) |

(52) U.S. Cl.
CPC ............ *G01S 19/22* (2013.01); *G01S 19/26* (2013.01); *G01S 19/42* (2013.01); *G01S 19/52* (2013.01)

(58) Field of Classification Search
CPC .......... G01S 19/22; G01S 19/26; G01S 19/42; G01S 19/52; G01S 19/30; G01S 19/428; G01S 5/2073

USPC .................................................. 342/357.61
See application file for complete search history.

(56) References Cited

U.S. PATENT DOCUMENTS

| | | | | |
|---|---|---|---|---|
| 8,908,744 | B1* | 12/2014 | Qi ..................... | H04B 17/345 375/149 |
| 10,051,437 | B1* | 8/2018 | Deng ................. | H04L 27/2271 |
| 2003/0165186 | A1* | 9/2003 | Kohli ................ | G01C 21/26 375/150 |
| 2007/0098055 | A1* | 5/2007 | Raman .............. | G01S 19/22 375/150 |
| 2010/0039316 | A1* | 2/2010 | Gronemeyer ..... | G01S 19/34 342/357.48 |
| 2011/0169689 | A1* | 7/2011 | Wang ................ | G01C 21/165 342/357.3 |

* cited by examiner

*Primary Examiner* — Timothy X Pham

(57) ABSTRACT

The present disclosure describes apparatuses and techniques for measuring position and velocity. In some aspects, Global Navigation Satellite System (GNSS) signals and feedback information are received. The feedback information may include predicted code phase information and predicted Doppler information. The feedback information is used to define a LOS region of a search space, the search space having dimensions in a code phase domain and in a Doppler domain. The GNSS signals within the search space are operated on to produce measurements of the GNSS signals across the code phase domain and the Doppler domain of the search space. The produced measurements are operated on within the LOS region of the search space to select measurements associated with a line of sight (LOS) signal. The selected measurements are operated on to produce position and/or velocity information associated with the LOS signal.

20 Claims, 7 Drawing Sheets

APPARATUSES AND METHODS FOR MEASURING POSITION AND VELOCITY

CROSS REFERENCE TO RELATED APPLICATIONS

This application claims priority to U.S. Provisional Patent Application Ser. No. 62/314,936 filed on Mar. 29, 2016, U.S. Provisional Patent Application Ser. No. 62/337,851 filed on May 17, 2016, and U.S. Provisional Patent Application Ser. No. 62/369,559 filed on Aug. 1, 2016, the disclosures of which are incorporated by reference herein.

BACKGROUND

The background description provided herein is for the purpose of generally presenting the context of the disclosure. Unless otherwise indicated herein, the approaches described in this section are not prior art to the claims in this application and are not admitted to be prior art by inclusion in this section.

Measuring accurate position and/or velocity information is an important aspect of a Global Navigation Satellite System (GNSS), examples of which include Global Positioning System (GPS) and GLObal NAvigation Satellite System (GLONASS). However, conventional GNSS devices are susceptible to multipath influences, which decrease measurement accuracies. For example, conventional GNSS devices are unable to separate a desired line of sight (LOS) signal from undesired multipath signals. This causes the undesired multipath signals to overlap and interfere with the LOS signal. In addition, conventional GNSS devices utilize simple logic to select the GNSS signal with the highest peak amplitude for calculating the position and/or velocity information. However, the GNSS signal with the highest peak amplitude may not always be the desired LOS signal due to multipath influences. Consequently, the conventional GNSS devices are less accurate.

GNSS devices may also include additional sensors for measuring speed, acceleration, and rotational attributes. These sensors may be used in dead reckoning systems to provide position and/or velocity information when GNSS signals are unavailable. However, these sensors may experience large turn-on biases and in-run biases, which decrease measurement accuracies. Consequently, the sensors in GNSS devices are not accurate enough to adequately improve the accuracy of the GNSS measurements.

SUMMARY

This summary is provided to introduce subject matter that is further described below in the Detailed Description and Drawings. Accordingly, this Summary should not be considered to describe essential features nor used to limit the scope of the claimed subject matter.

In some aspects, a method is described that receives Global Navigation Satellite System (GNSS) signals and feedback information. The feedback information may include predicted code phase information and predicted Doppler information. The feedback information is used to define a LOS region of a search space. The GNSS signals within the search space are operated on to produce measurements of the GNSS signals across the code phase domain and the Doppler domain of the search space. The produced measurements are operated on within the LOS region of the search space to select measurements associated with a line of sight (LOS) signal. The selected measurements are operated on to produce position and/or velocity information associated with the LOS signal.

In other aspects, a System-on-Chip (SoC) is described that includes a GNSS receiver and a navigation filter. The GNSS receiver is configured to receive GNSS signals. The GNSS receiver operates on the GNSS signals within a search space to produce measurements of the GNSS signals across a code phase domain and a Doppler domain of the search space. The GNSS receiver is configured to receive feedback information and to use the feedback information to define a LOS region of the search space. The navigation filter operates on the produced measurements within the LOS region of the search space to select measurements associated with the LOS signal. The navigation filter operates on the selected measurements to produce position and/or velocity information associated with the LOS signals.

In yet other aspects, a GNSS device is configured to receive GNSS signals. The GNSS device generates predicted code phase information and predicted Doppler information based on previously received GNSS signals. The GNSS device uses the predicted code phase information and predicted Doppler information to define a LOS region of a search space. The GNSS device operates on the GNSS signals within the search space to produce measurements of the GNSS signals across the code phase domain and the Doppler domain of the search space. The GNSS device operates on the produced measurements within the LOS region of the search space to select measurements associated with the LOS signal. The GNSS device operates on the selected measurements to produce position and/or velocity information associated with the LOS signal.

The details of one or more implementations are set forth in the accompanying drawings and the following description. Other features and advantages will be apparent from the description and drawings, and from the claims.

BRIEF DESCRIPTION OF THE DRAWINGS

In the figures, the left-most digit of a reference number identifies the figure in which the reference number first appears. The use of the same reference numbers in different instances in the description and the figures indicate like elements.

DETAILED DESCRIPTION

Figure 1:
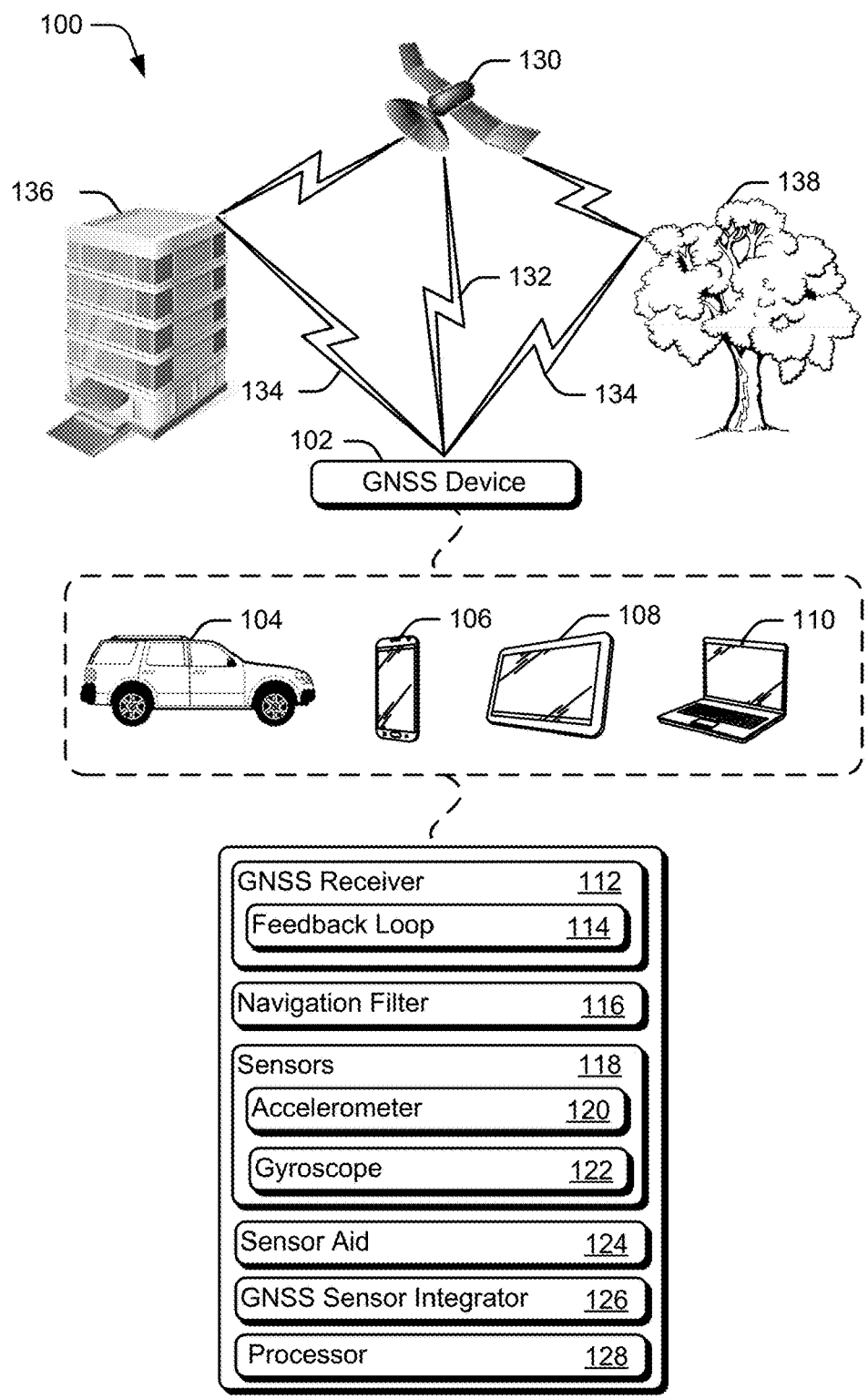
FIG. 1 illustrates an operating environment having example GNSS devices in accordance with one or more aspects.

Conventional techniques for determining position and/or velocity information often rely on a Global Navigation Satellite System (GNSS) and/or sensors. However, conventional GNSS devices are susceptible to multipath influences, which decrease measurement accuracies. Additionally, in conventional GNSS devices that include additional sensors, the sensors have inherent biases that prevent sensor data from improving the GNSS measurement accuracies. This disclosure describes apparatuses and techniques for improving the accuracy of position and/or velocity measurements of GNSS devices.

This disclosure describes a GNSS device including a GNSS receiver configured to separate a line of sight (LOS) signal from multipath signals, thereby reducing the susceptibility of the GNSS receiver to inaccuracies associated with multipath influences. In addition, the GNSS receiver includes a feedback loop which provides feedback information to the GNSS receiver. The feedback information provides information about the LOS signal which allows the GNSS receiver to define a LOS region of a search space. The search space defines a first set of code phases and Doppler frequencies the GNSS receiver will process. The LOS region defines a second set of code phases and Doppler frequencies the GNSS receiver will use to select measurements associated with the LOS signal. The LOS region is smaller than the search space, which reduces the number of candidate GNSS signals for selection. By reducing the size of the search space, the LOS region increases the likelihood of correctly selecting the LOS signal. Furthermore, the GNSS device includes a navigation filter configured to select one of the GNSS signals within the LOS region of the search space based on the feedback information. By using the feedback information, the navigation filter does not solely rely on amplitude for selecting one of the GNSS signals within the LOS region, which further increases the likelihood of correctly selecting the LOS signal. The selected measurements are operated on to produce position and/or velocity information associated with the LOS signal.

In at least some embodiments, the GNSS device further includes sensors, a sensor aid, and a GNSS sensor integrator. The sensor aid estimates biases associated with the sensors and generates sensor aiding data with the biases removed. The GNSS sensor integrator integrates the position and/or velocity information determined from the selected GNSS signal with the sensor aiding data to produce sensor-aided position and/or velocity information. Additionally, or alternatively, the GNSS sensor integrator integrates the position and/or velocity information determined from the selected GNSS signal and the sensor aiding data to produce sensor-aided feedback information which may be provided to the GNSS receiver by the feedback loop. By removing biases associated with the sensors and integrating the GNSS data and sensor aiding data, the measurements by the GNSS device are more accurate than current techniques which do not have a feedback loop, do not remove sensor biases, and do not integrate sensor aiding data with position and/or velocity information produced from GNSS signals.

The following discussion describes an operating environment, example GNSS devices in accordance with one or more aspects, example methods in accordance with one or more aspects, an example sensor aid in accordance with one or more aspects, and a System-on-Chip (SoC) in which components of the operating environment can be embodied. In the discussion below, reference is made to the operating environment by way of example only.

Operating Environment

FIG. 1 illustrates an example operating environment 100 including a GNSS device 102. The GNSS device 102 can be embodied as any suitable type of device including, by way of example and not limitation, a vehicle 104, a smart phone 106, a tablet computing device 108, a laptop computing device 110, a smart watch, a Global Positioning System (GPS) device, a GPS pet tracker, a GPS fitness tracker, and the like. The GNSS device 102 includes a GNSS receiver 112 having a feedback loop 114, a navigation filter 116, and sensors 118 including an accelerometer 120 and a gyroscope 122. The GNSS device 102 includes a sensor aid 124, a GNSS sensor integrator 126, and a processor 128.

The GNSS device 102 is configured to measure position and/or velocity information based on received GNSS signals transmitted from multiple satellites, such as satellite 130. The received GNSS signals include a line of sight (LOS) signal 132 and multipath signals 134. The LOS signal 132 is received along a line of sight path between the GNSS device 102 and the satellite 130. The multipath signals 134 are received along a path other than the line of sight. For example, the multipath signals 134 may be received via reflections from a building 136, tree 138, and the like. The multipath signals 134 are likely to occur in environments such as urban canyons and mountainous terrain. An urban canyon is a setting in which multiple tall obstacles such as buildings, towers, and the like, can reflect signals that are received by the GNSS device 102.

The GNSS receiver 112 is configured to separate the LOS signal 132 from the multipath signals 134 so that the multipath signals 134 do not overlap and interfere with the LOS signal 132. As an example, the LOS signal 132 and the multipath signals 134 may be separated by increasing frequency resolution and increasing coherent integration time. By way of example, the GNSS receiver 112 may be configured to provide a frequency resolution of 5 hertz with a long coherent integration time of 200 milliseconds. The advantages of using the GNSS receiver 112 as configured include preventing the multipath signals 134 from overlapping and interfering with the LOS signal 132, thereby preventing the multipath signals 134 from decreasing the accuracy of the position and/or velocity measurements. As a result, GNSS measurement accuracies are increased over conventional approaches which do not separate the multipath signals 134 from the LOS signal 132.

The feedback loop 114 of the GNSS receiver 112 provides feedback information to enhance selection of the LOS signal 132. As an example, the feedback information may include predicted code phase information and predicted Doppler information of the LOS signal 132. The predicted code phase information and the predicted Doppler information may be developed based on previously received GNSS signals, which is described below in more detail. The feedback information provided by the feedback loop 114 is used to define a LOS region of a search space. The LOS region defines a portion of the search space used for selecting the LOS signal. In the illustrated and described embodiment, the search space can be considered to define a set of code phases and Doppler frequencies the GNSS receiver 112 will process. Alternatively or additionally, the feedback loop 114 may provide the feedback information to the navigation filter 116. The navigation filter 116 is configured to select the LOS signal 132. The navigation filter 116 may be implemented separate from the GNSS receiver 112 or implemented within the GNSS receiver 112 and may be embodied as processor-executable instructions. The navigation filter 116 uses information about the LOS signal 132 to choose the GNSS signal with the most accurate signal within the LOS region. This information about the LOS signal 132 may include nominal code phase information and nominal Doppler information determined previously by the navigation filter 116. The nominal code phase information and the nominal Doppler information may be stored in the navigation filter 116 or provided by the feedback loop 114. Alternatively or additionally, this information may include the feedback information such as the predicted code phase information and the predicted Doppler information provided by the feedback loop 114. The selected measurements associated with the LOS signal 132 are then used to produce position and/or velocity information. Additionally, the selected measurements associated with the LOS signal 132 may be used to produce the nominal code phase information, nominal Doppler information, and/or feedback information. The nominal code phase information, nominal Doppler information, and/or feedback information may then be used for selecting subsequent GNSS signals.

The advantages of using a feedback loop 114 to provide feedback information include, by way of example and not limitation, defining the LOS region that reduces a size of the search space and reduces the number of the multipath signals 134 considered in the selection process. In addition, the advantages of selecting the most accurate GNSS signal include selecting the GNSS signal most likely to be the LOS signal 132 in the LOS region based on additional information other than amplitude. Since an amplitude of the LOS signal 132 may not be the highest amplitude in the LOS region, using the navigation filter 116 as configured above increases the likelihood of selecting the LOS signal 132. As a result, GNSS position and/or velocity measurement accuracies are increased over previous approaches that do not employ the innovative techniques described herein.

The GNSS device 102 may further include the sensors 118, the sensor aid 124, and the GNSS sensor integrator 126 as noted above. By way of example, the sensors 118 may include the accelerometer 120 and/or the gyroscope 122. The sensors 118 may be implemented in an inertial measurement unit (IMU) and can include low-cost microelectromechanical system (MEMS) sensors. The sensor aid 124 and the GNSS sensor integrator 126 may be embodied as processor-executable instructions. The GNSS sensor integrator 126 may be implemented as a Kalman filter, a least square filter, or the like. The sensors 118, the sensor aid 124, and the GNSS sensor integrator 126 may also be incorporated in a dead reckoning system, such as an automotive dead-reckoning system.

The sensors 118 have inherent turn-on and in-run biases. The sensor aid 124 is configured to estimate biases associated with sensors 118 and produce sensor aiding data with the biases removed. The GNSS sensor integrator 126 is configured to integrate GNSS data and sensor aiding data to produce sensor-aided position and/or velocity information. The feedback loop 114 may be configured to provide sensor aided feedback information to the GNSS receiver 112. By estimating and removing the biases associated with the sensors 118, the sensor aiding data improves the accuracy of the position and/or velocity information produced from the selected GNSS signals by providing additional independent measurements which integrate with the GNSS position and/or velocity information to further mitigate GNSS inaccuracies. Alternatively or additionally, the sensor aiding data may be used to evaluate the accuracy of the GNSS position and/or velocity information. The accuracy improvements provided by the sensor aiding data propagate through the GNSS device 102 by way of the feedback loop 114 as the sensor aiding data improves the accuracy of the feedback information. Increasing the accuracy of the feedback information leads to a smaller LOS region and higher likelihood of selecting the LOS signal 132 by the navigation filter 116. As a result, GNSS measurement accuracies are increased over conventional approaches.

The processor 128 of the GNSS device 102 may be a single core or multiple core processor and may be configured in any suitable manner (e.g., a heterogeneous multi-core application processor). The processor 128 may include one or more processors and may be incorporated in the GNSS receiver 112. The processor 128 may be configured to implement the navigation filter 116, the sensor aid 124, and/or the GNSS sensor integrator 126.

Figure 2:
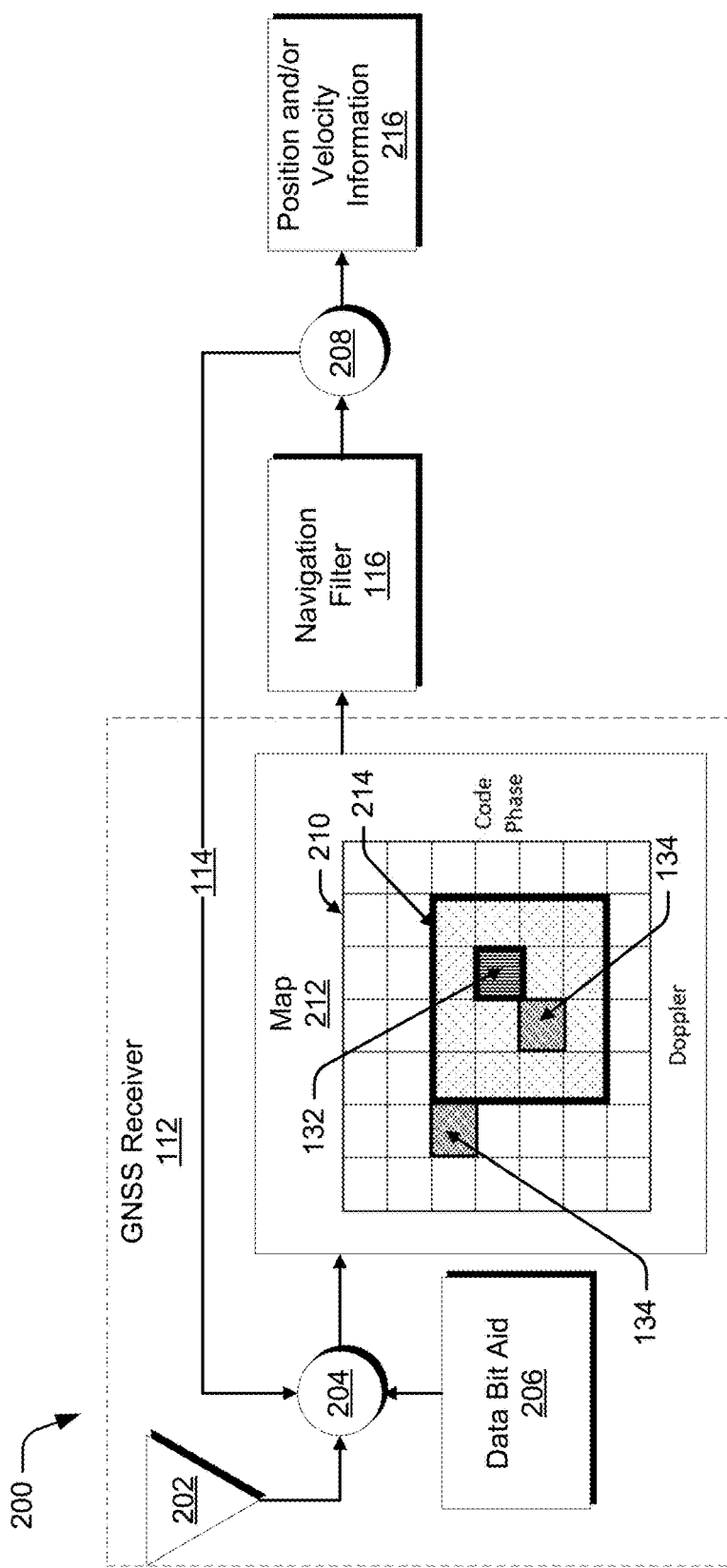
FIG. 2 illustrates an example GNSS device in accordance with one or more aspects.

FIG. 2 illustrates a specific example of GNSS device 200, in accordance with one embodiment. In this example, the GNSS device 200 includes the GNSS receiver 112 having the feedback loop 114, an antenna 202, an operator 204, and a data bit aid 206. The GNSS device 200 also includes the navigation filter 116 and an operator 208. The navigation filter 116 may be included as part of the GNSS receiver 112 and/or the operator 208 may be included as part of the navigation filter 116 (not shown). The GNSS receiver 112 may also include components to assist with receiving and processing GNSS signals such as low noise amplifiers, band pass filters, oscillators, mixers, an analog to digital converter, correlators, and processors (not shown).

In operation, the antenna 202 receives GNSS signals, including the LOS signal 132 and the multipath signals 134. Upon receiving the GNSS signals from the antenna 202, the GNSS receiver 112 may be configured to down convert and digitize the received GNSS signals (not shown). The GNSS signals are provided to the operator 204 which operates on the received GNSS signals in a search space 210 to produce measurements of the GNSS signals across a code phase domain and a Doppler domain of the search space 210.

The operator 204 uses long coherent integration to separate the LOS signal 132 from the multipath signals 134 in the Doppler domain. To enable the operator 204 to perform long coherent integration without loss of information, the data bit aid 206 is configured to provide a raw data bit and remove a navigation data bit associated with the GNSS signals. In the illustrated and described embodiment, the data bit aid 206 allows the GNSS receiver 112 to extend the coherent integration time longer than the conventional 20 milliseconds, which corresponds to the duration of the 50 hertz navigation message data bit period. The GNSS receiver 112 may be configured to extend the coherent integration time to 200 milliseconds. Increasing the coherent integration time increases the frequency resolution. A long coherent integration time of 200 milliseconds provides a frequency resolution of 5 Hz, which is a finer resolution than the conventional 50 Hz frequency resolution. As a result, the increased frequency resolution separates the LOS signal 132 and the multipath signals 134.

The operator 204 produces measurements of the GNSS signals across the search space 210, the search space 210 having dimensions in the code phase domain and the Doppler domain. The search space 210 and the produced measurements are represented in map 212, which represents, among other things, the LOS signal 132 and multipath signals 134. As an example, the map 212 illustrates three received GNSS signal peaks within the search space 210 corresponding to the LOS signal 132 and the multipath signals 134. Note that the LOS signal 132 and the multipath signals 134 are separated in the Doppler domain due to the long coherent integration and/or increased frequency resolution of the GNSS receiver 112. The produced measurements are provided as input to the navigation filter 116.

The navigation filter 116 operates on the produced measurements to select measurements associated with the LOS signal 132. The navigation filter 116 uses information about the LOS signal 132 to select the most accurate GNSS signal in the search space 210. The information about the LOS signal 132 may include, by way of example and not limitation, nominal code phase information and nominal Doppler information determined previously by the navigation filter 116 and/or by feedback information such as predicted code phase information and predicted Doppler information provided by the feedback loop 114.

In order to correctly select the LOS signal 132, the navigation filter 116 defines an LOS region 214 of the search space 210. All GNSS signals inside the LOS region 214 are candidates for selection. The GNSS signals outside the LOS region 214 are not candidates for selection. The LOS region 214 is defined by a set of code phases $L_r$ and a set of Doppler frequencies $L_f$ according to the following equations:

$$L_\tau = [-m\sigma_{\Delta\tau}, m\sigma_{\Delta\tau}]$$

where m is a confidence level and $\sigma_{\Delta\tau}$ is the LOS code phase standard deviation defined by the following equation:

$$\sigma_{\Delta\tau} = \sqrt{\frac{[\vec{h}_{LOS}\ 1]P_{pb}[\vec{h}_{LOS}\ 1]^T}{L^2}}$$

where $\vec{h}_{LOS}$ is a unit vector of the LOS signal 132, $P_{pb}$ is a covariance between position and clock bias, L is a signal code wavelength (e.g., around 300 meters for an L1 GPS signal), and T symbolizes a transpose of the matrix.

$$L_f = [-m\sigma_{\Delta f}, m\sigma_{\Delta f}]$$

where m is a confidence level and $\sigma_{\Delta f}$ is the LOS Doppler frequency standard deviation defined by the following equation:

$$\sigma_{\Delta f} = \sqrt{\frac{[\vec{h}_{LOS}\ 1]P_{vd}[\vec{h}_{LOS}\ 1]^T}{\lambda^2}}$$

where $P_{vd}$ is the covariance between velocity and clock drift and $\lambda$ is a wavelength of the LOS signal 132.

As an example, the $P_{pb}$ and $P_{vd}$ may be obtained from a Kalman filter, least square filter, or the like. The confidence level m may be dynamically adjusted according to the confidence level of the LOS information. As an example, the confidence level m may be set to 2 to indicate 95.4% confidence.

Due to multipath influences, there may be multiple GNSS signals in the LOS region 214 of the search space 210. In this example, the LOS region 214 includes the LOS signal 132 and one of the multipath signals 134. In order to correctly select the LOS signal 132 from the multiple GNSS signals in the LOS region 214, the navigation filter 116 selects the GNSS signal with the smallest code phase offset relative to the LOS information. For example, the navigation filter 116 may select the measurements associated with the LOS signal based on the predicted code phase information and the predicted Doppler information provided by the feedback loop 114. By comparing the code phase and Doppler frequency of each GNSS signal in the LOS region 214 to the predicted code phase information and the predicted Doppler information, the navigation filter 116 calculates the offset associated with each GNSS signal in the LOS region 214 and selects the GNSS signal with the smallest offset. Additionally or alternatively, an empirical weighting model may be utilized to further guarantee selection of the LOS signal 132. By using the LOS information to define the LOS region 214, which reduces the number of candidate GNSS signals and by using the LOS information to select the GNSS signal which most likely corresponds to the LOS signal 132, the navigation filter 116 is better configured to correctly select the LOS signal 132 over conventional approaches.

The operator 208 operates on the selected measurements to produce position and/or velocity information 216. Additionally, the operator 208 operates on the selected measurements to provide feedback information to the feedback loop 114, such as predicted code phase information and predicted Doppler information and/or nominal code phase information and nominal Doppler information. Additionally or alternatively, the feedback information may be provided to the navigation filter 116. The feedback information is used in processing the next set of received GNSS signals.

Figure 3:
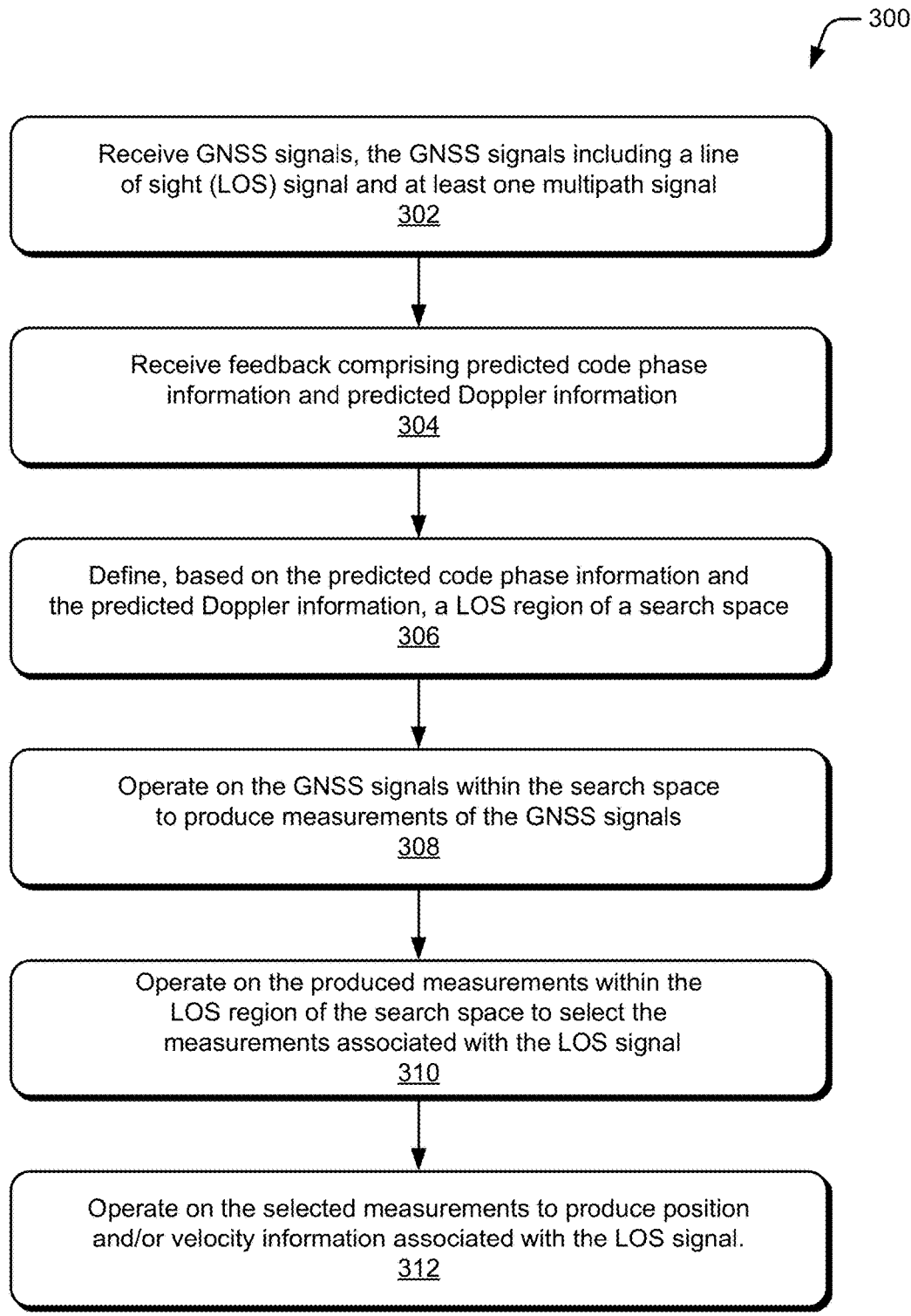
FIG. 3 illustrates an example method of producing position and/or velocity information in accordance with one or more aspects.

FIG. 3 illustrates a flow diagram that describes operations in a method 300 in accordance with one or more embodiments. The method 300 is not necessarily limited to the order shown for performing the operations. Further, the method 300 can be implemented in connection with any suitable hardware, software, firmware, or combination thereof. In the illustrated and described embodiment, the method 300 can be implemented by any suitably-configured components. For example, the operations of method 300 can be performed by a GNSS device, such as the GNSS device 102.

At 302 the GNSS device 102 receives GNSS signals, including a line of sight (LOS) signal and at least one multipath signal. For example, the antenna 202 of the GNSS device 102 receives the LOS signal 132 and the multipath signals 134.

At 304 the GNSS device 102 receives feedback comprising predicted code phase information and predicted Doppler information. For example, the GNSS receiver 112 of the GNSS device 102 receives the feedback from the navigation filter 116 of the GNSS device 102.

At 306 the GNSS device 102 defines a LOS region of a search space based on the predicted code phase information and the predicted Doppler information. The LOS region may be defined as a set of code phases and Doppler frequencies and used for selecting the GNSS signal associated with the LOS signal. The LOS region is used to reduce a size of the search space, which reduces the number of candidate GNSS signals for selection.

At 308 the GNSS device 102 operates on the GNSS signals within the search space to produce measurements of the GNSS signals. The operations may include performing long coherent integration in order to separate the LOS signal from the multipath signals. Additionally, the operations may include using a raw data bit and removing a navigation data bit in the GNSS signals to perform the long coherent integration without loss of information. The produced measurements may include, by way of example and without limitation, amplitude, code phase, and Doppler frequency of the GNSS signals.

At 310 the GNSS device 102 operates on the produced measurements within the LOS region of the search space to select the measurements associated with the LOS signal. The operations may include selecting the most accurate signal based on a code phase offset of the GNSS signals within the LOS region relative to LOS information. The LOS information may include nominal code phase information and nominal Doppler information previously determined or feedback information such as the predicted code phase information and the predicted Doppler information. Additionally or alternatively, an empirical weighting model may be utilized to further guarantee selection of the LOS signal.

At 312 the GNSS device 102 operates on the selected measurements to produce position and/or velocity information associated with the LOS signal. Additionally or alternatively, the position and/or velocity information may be used to update the predicted code phase information and predicted Doppler information provided to the feedback loop and used for selecting the next GNSS signal associated with the LOS signal.

Figure 4:
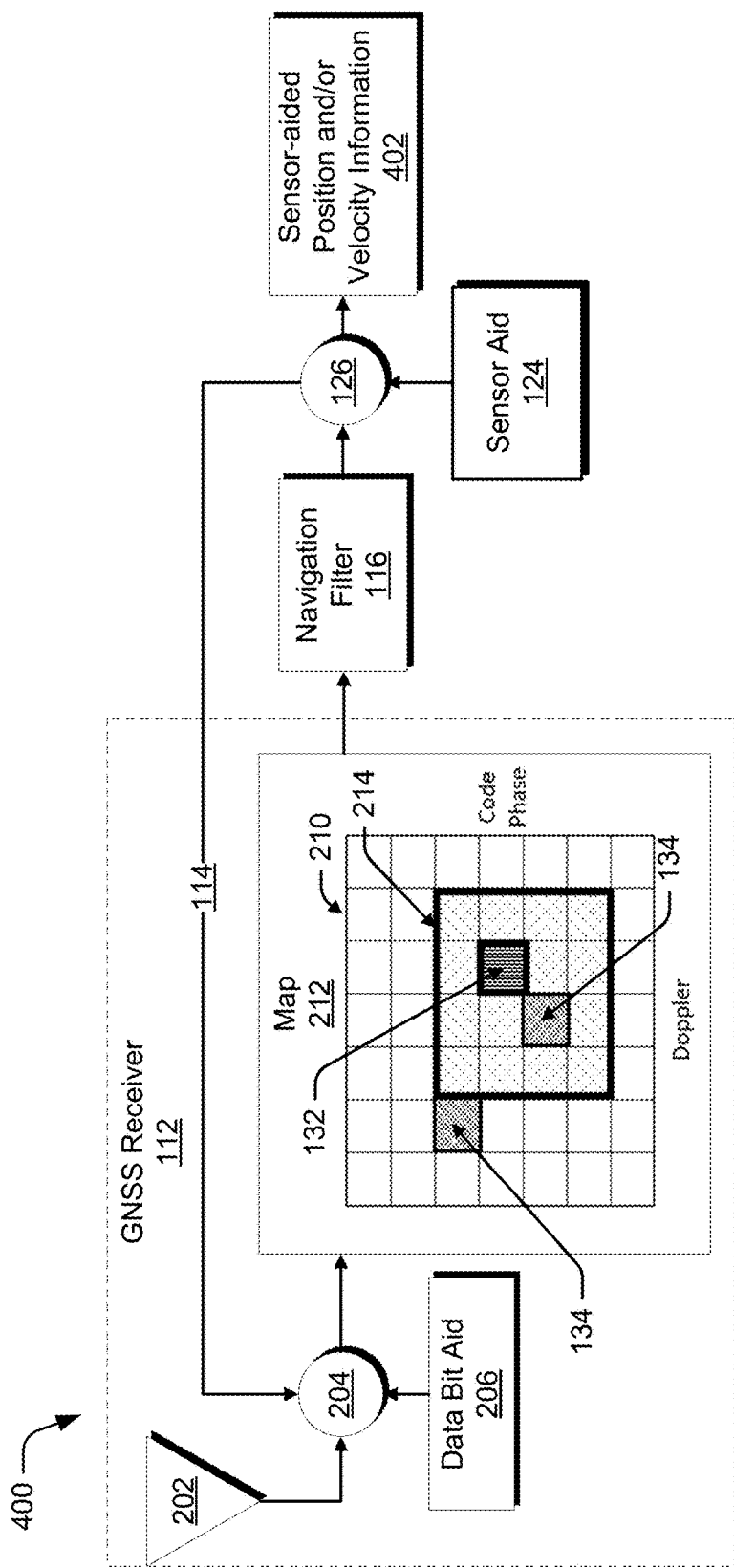
FIG. 4 illustrates another example GNSS device in accordance with one or more aspects.

FIG. 4 illustrates a specific example of GNSS device 400, in accordance with another embodiment. In this example, the GNSS device 400 is similar to the GNSS device 200 in FIG. 2, with the addition of the sensor aid 124 and the GNSS sensor integrator 126. Additionally, the GNSS device 400 is configured to produce sensor-aided position and/or velocity information 402.

As described above with respect to FIG. 2, the antenna 202 receives GNSS signals, the operator 204 operates on the received GNSS signals within a search space to produce measurements, and the navigation filter 116 operates on the produced measurements to select the measurements associated with the LOS signal 132.

In operation, the sensor aid 124 receives sensor aiding data from one or more of the sensors 118 (not shown). For example, the sensor aid 124 may receive gyroscope data and/or accelerometer data. The sensor aid 124 estimates a bias associated with the sensor aiding data and removes the bias from the sensor aiding data. The sensor aid 124 provides the sensor aiding data as input to the GNSS sensor integrator 126. By estimating and removing biases associated with the sensors 118, the sensor aid 124 increases the accuracy of sensor aiding data which allows for the use of low-cost, less precise sensors and reduces the need for additional sensors.

The GNSS sensor integrator 126 uses the sensor aiding data from the sensor aid 124 and operates on the selected measurements from the navigation filter 116 to produce sensor-aided position and/or velocity information 402. Additionally or alternatively, the GNSS sensor integrator 126 produces sensor-aided feedback information for the feedback loop 114. The sensor-aided feedback information may be based on the sensor-aided position and/or velocity information 402. For example, sensor-aided feedback information may include sensor-aided predicted code phase information and/or sensor-aided predicted Doppler information. By estimating and removing biases associated with the sensors 118, the sensor aiding data improves the accuracy of the position and/or velocity information produced in FIG. 2 by providing additional independent measurements which integrate with the position and/or velocity information determined from the GNSS signals to further mitigate GNSS inaccuracies. The accuracy improvements provided by the sensor aiding data propagate through the GNSS device 400 by way of the feedback loop 114. Increasing the accuracy of the feedback information leads to an accurate LOS region 214 and higher likelihood of selecting the LOS signal 132 by the navigation filter 116. Additionally or alternatively, the size of the LOS region 214 may be decreased responsive to the increased confidence of the feedback information. As a result, GNSS measurement accuracies are increased over conventional approaches.

Figure 5:
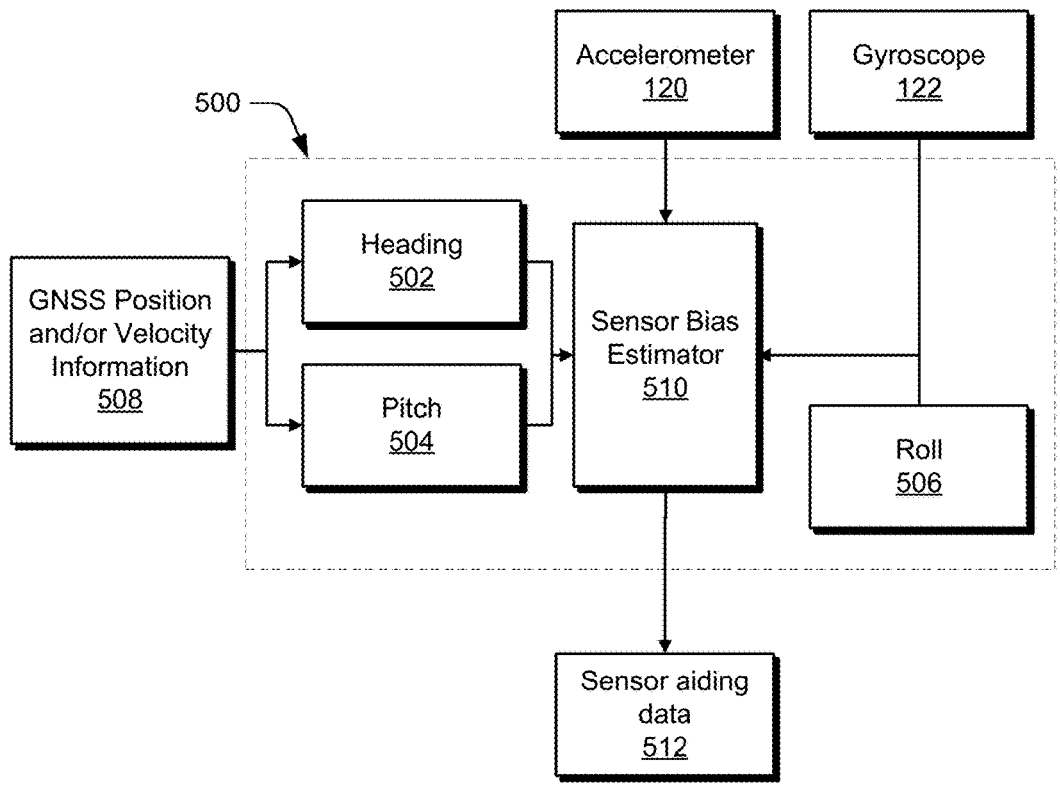
FIG. 5 illustrates an example sensor aid in accordance with one or more aspects.

FIG. 5 illustrates an example sensor aid 500. The sensor aid 500 estimates a heading 502, pitch 504 and roll 506 of the GNSS device 400. In some embodiments, the heading 502 and the pitch 504 may be calculated based on GNSS position and/or velocity information 508, whereby the GNSS position and/or velocity information 508 is produced based on selected measurements associated with the LOS signal as shown above. A minimum velocity may be required when using the GNSS position and/or velocity information 508 to calculate the heading 502 and the pitch 504. By way of example, a minimum velocity of 2 meters per second may be used to ensure accuracy of the GNSS position and/or velocity information 508. The heading 502 may be calculated based on the GNSS position and/or velocity information 508 according to the following equation:

$$\psi = \mathrm{atan}\left(\frac{V_N}{V_E}\right)$$

where $\psi$ is the heading angle, $V_N$ is the GNSS north velocity, and $V_E$ is the GNSS east velocity.

The pitch 504 may be calculated based on the GNSS position and/or velocity information 508 according to the following equation:

$$\theta = \mathrm{atan}\left(\frac{V_U}{V_H}\right)$$

where $\theta$ is the pitch, $V_U$ is the GNSS vertical velocity, and $V_H$ is the GNSS horizontal velocity. In most applications, the Roll 506 is assumed to be negligible.

The sensor aid 500 also includes sensor bias estimator 510 which estimates biases associated with the accelerometer 120 and the gyroscope 122. The sensor bias estimator 510 may include a single filter or multiple filters. As an example, the sensor bias estimator 510 estimates accelerometer residual $\delta g^n$ using the heading 502, the pitch 504, the roll 506, data from the accelerometer 120, and data from the gyroscope 122. The accelerometer residual $\delta g^n$ is a function of attitude error $\varepsilon$ and accelerometer bias $\delta g^b$ according to the following equation:

$$\delta g^n = \begin{bmatrix} 0 & G & 0 \\ -G & 0 & 0 \\ 0 & 0 & 0 \end{bmatrix} \begin{bmatrix} \varepsilon_E \\ \varepsilon_N \\ \varepsilon_U \end{bmatrix} - C_b^n \delta g^b$$

where G is nominal gravity, $\varepsilon_E$, $\varepsilon_N$, $\varepsilon_Y$ are easting, northing, and up attitude error, and $C_b^n$ is the attitude rotation matrix defined by the following north-east-down coordinate system equation:

$$C_b^n = \begin{bmatrix} \cos\theta\cos\psi & -\cos\gamma\sin\psi + \sin\gamma\sin\theta\cos\psi & \sin\gamma\sin\psi + \cos\gamma\sin\theta\cos\psi \\ \cos\theta\sin\psi & \cos\gamma\cos\psi + \sin\gamma\sin\theta\sin\psi & -\sin\gamma\cos\psi + \cos\gamma\sin\theta\sin\psi \\ -\sin\theta & \sin\gamma\cos\theta & \cos\gamma\cos\theta \end{bmatrix}$$

where $\theta$ is the pitch, $\psi$ is the heading angle, and $\gamma$ is the roll In addition to the above equations, the sensor bias estimator 510 uses a full error equation model including measurement models for acceleration $H_\alpha$, heading $H_\psi$, pitch $H_\theta$, and roll $H_\gamma$. The measurement models are defined according to the following equations:

$$H_a = \begin{bmatrix} \begin{bmatrix} 0 & G & 0 \\ -G & 0 & 0 \\ 0 & 0 & 0 \end{bmatrix} & 0 & C_b^n \end{bmatrix}$$

$$H_\psi = \begin{bmatrix} 0 & 0 & 1 \end{bmatrix} \begin{bmatrix} \varepsilon_E \\ \varepsilon_N \\ \varepsilon_U \end{bmatrix}$$

$$H_\theta = \begin{bmatrix} 0 & 1 & 0 \end{bmatrix} \begin{bmatrix} \varepsilon_E \\ \varepsilon_N \\ \varepsilon_U \end{bmatrix}$$

$$H_\gamma = \begin{bmatrix} 1 & 0 & 0 \end{bmatrix} \begin{bmatrix} \varepsilon_E \\ \varepsilon_N \\ \varepsilon_U \end{bmatrix}$$

The use of a full error equation model is advantageous because the attitude error and the accelerometer bias are coupled and cannot be separated. Conventional bias estimators use simplified error state models and require the addition of other sensors, such as a wheel speed sensor, to improve accuracy. Instead, sensor aid 500 increases accuracy by using GNSS position and/or velocity information 508 and a full error equation model and does not require additional sensors.

Additionally or alternatively, sensor aid 500 estimates biases associated with gyroscope 122. Sensor bias estimator 510 determines a standard deviation of the accelerometer data. The standard deviation of the accelerometer data is compared to a threshold to determine if the GNSS device is stationary or moving. The sensor bias estimator 510 measures an average bias of gyroscope 122 when the GNSS device is determined to be stationary.

After estimating biases associated with sensors, sensor aid 500 produces sensor aiding data 512 with sensor biases removed. The sensor aiding data 512 may be used to generate sensor-aided position and/or velocity information. Additionally or alternatively, the sensor aiding data may be used to generate sensor-aided feedback information such as sensor-aided predicted code phase information and sensor-aided predicted Doppler information.

Figure 6:
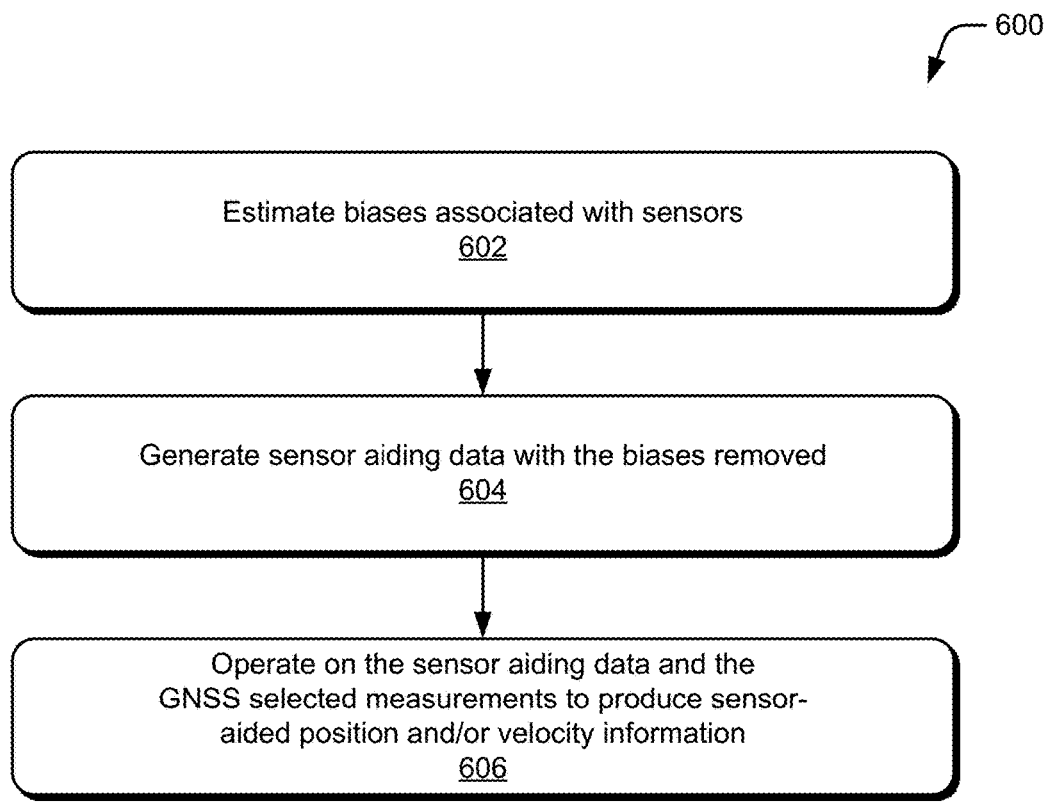
FIG. 6 illustrates an example method of producing sensor aiding data in accordance with one or more aspects.

FIG. 6 illustrates a flow diagram that describes operations in a method 600 in accordance with one or more embodiments. Method 600 is not necessarily limited to the order shown for performing the operations. Method 600 can be implemented in connection with any suitable hardware, software, firmware, or combination thereof. In the illustrated and described embodiment, method 600 can be implemented by any suitably-configured components. For example, the operations of method 300 can be performed by a GNSS device, such as the GNSS device 102.

At 602, the GNSS device 102 estimates biases associated with sensors. As an example, biases may include turn-on and in-run biases. The biases may be estimated using a full error equation model. For example, the sensor aid 124 of the GNSS device 102 can estimate biases associated with the sensors 118 of the GNSS device 102.

At 604 the GNSS device 102 generates sensor aiding data with the biases removed. Removing the biases increases the accuracy of the sensor aiding data.

At 606 the GNSS device 102 operates on the sensor aiding data and the GNSS selected measurements to produce sensor-aided position and/or velocity information. Additionally or alternatively, sensor-aided feedback information may be produced.

System-on-Chip

Figure 7:
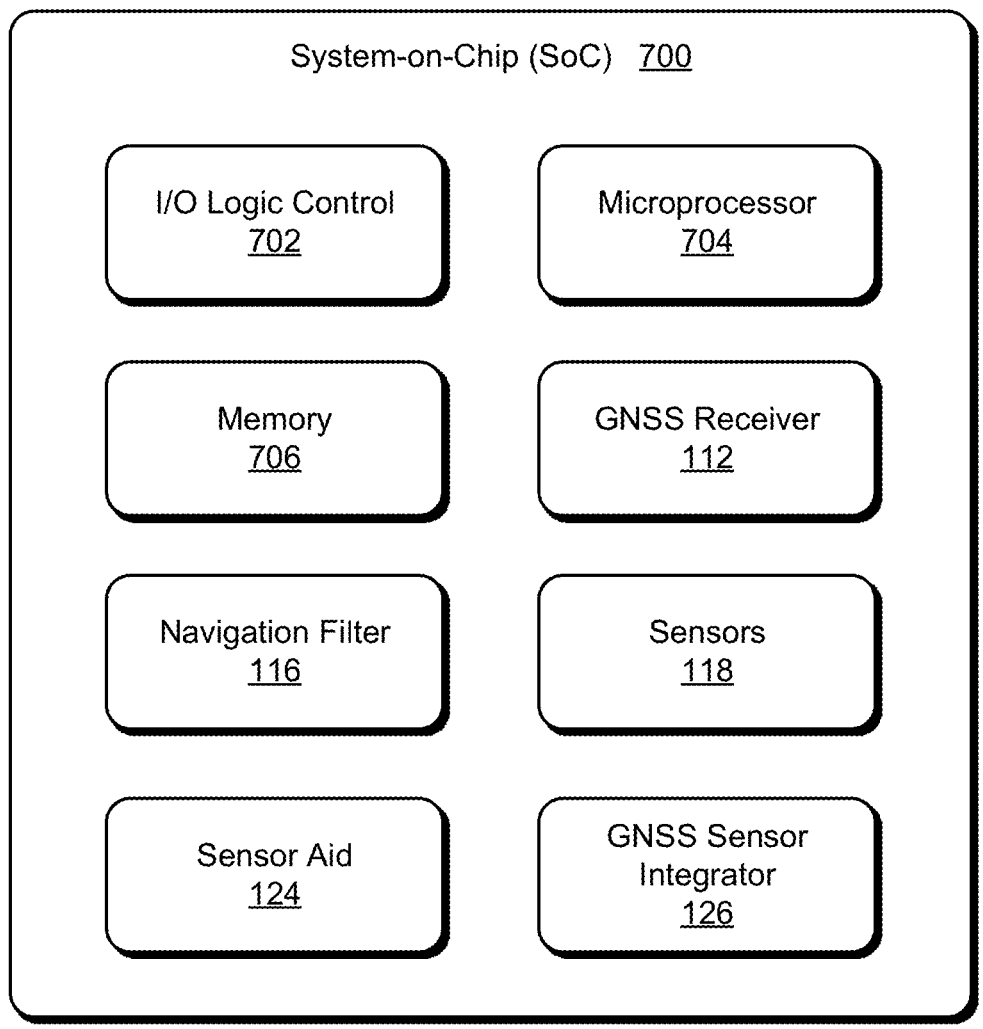
FIG. 7 illustrates a System-on-Chip (SoC) environment in accordance with one or more aspects.

FIG. 7 illustrates a System-on-Chip (SoC) 700, which can implement various embodiments described above. A SoC can be implemented in any suitable device, such as a smart-phone, desktop computer, laptop computer, remote control, tablet computer, and/or any other type of device.

SoC 700 can be integrated with electronic circuitry, a microprocessor, memory, input-output (I/O) logic control, communication interfaces and components, other hardware, firmware, and/or software needed to provide communicative coupling for a device, such as any of the above-listed devices. SoC 700 can also include an integrated data bus or crossbar (not shown) that couples the various components of the SoC for data communication between the components. A wired or wireless communication device that includes SoC 700 can also be implemented with many combinations of differing components. In some cases, these differing components may be configured to implement concepts described herein over various types of wireless connections.

In this example, SoC 700 includes various components such as an input-output (I/O) logic control 702 (e.g., to include electronic circuitry) and a microprocessor 704 (e.g., any of a microcontroller or digital signal processor). SoC 700 also includes a memory 706, which can be any type of RAM, low-latency nonvolatile memory (e.g., Flash memory), ROM, and/or other suitable electronic data storage. SoC 700 can also include other various communication interfaces and components, communication components, other hardware, firmware, and/or software.

SoC 700 includes GNSS receiver 112 and navigation filter 116 (embodied as disparate or combined components as noted above). In some embodiments, SoC 700 also includes sensors 118, sensor aid 124, and GNSS sensor integrator 126. Examples of these various components, functions, and/or entities, and their corresponding functionality, are described with reference to the respective components of the environment 100 shown in FIG. 1 and components of GNSS device 200 and 400 shown in FIG. 2 and FIG. 4 respectively.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method of processing Global Navigation Satellite System (GNSS) signals, the method comprising:

receiving, with a GNSS receiver, GNSS signals that include a line of sight (LOS) signal and at least one multipath signal;

receiving, by the GNSS receiver, feedback comprising predicted code phase information and predicted Doppler information;

defining, by a navigation filter coupled to the GNSS receiver, a LOS region of a search space based on the predicted code phase information and the predicted Doppler information, the search space having dimensions in a code phase domain and in a Doppler domain, the search space including a first set of code phases and Doppler frequencies, the LOS region including a second set of code phases and Doppler frequencies, the second set of code phases and Doppler frequencies being smaller than the first set of code phases and Doppler frequencies;

operating on, by the GNSS receiver, the GNSS signals within the search space to produce measurements of the GNSS signals across the code phase domain and the Doppler domain of the search space;

operating on, by the navigation filter, the produced measurements within the LOS region of the search space to select measurements associated with the LOS signal; and operating on, by the navigation filter, the selected measurements to produce position or velocity information associated with the LOS signal.

2. The method of claim 1, wherein operating on the GNSS signals within the search space further comprises using long coherent integration to separate the LOS signal from the at least one multipath signal in the Doppler domain.

3. The method of claim 2, wherein using the long coherent integration further comprises removing a navigation data bit associated with the GNSS signals.

4. The method of claim 1, wherein operating on the produced measurements within the LOS region of the search space to select the measurements associated with the LOS signal further comprises selecting the measurements associated with the LOS signal based on the predicted code phase information and the predicted Doppler information.

5. The method of claim 1, wherein receiving the feedback further comprises using sensor aiding data to receive sensor-aided predicted code phase information and sensor-aided predicted Doppler information.

6. The method of claim 1, wherein operating on the selected measurements to produce position and/or velocity information further comprises using sensor aiding data to produce sensor-aided position and/or velocity information.

7. The method of claim 6, wherein using the sensor aiding data further comprises estimating a bias associated with the sensor aiding data and removing the bias from the sensor aiding data.

8. The method of claim 6, wherein using the sensor aiding data comprises using gyroscope data.

9. The method of claim 6, wherein using the sensor aiding data comprises using accelerometer data.

10. The method of claim 6, wherein using the sensor aiding data comprises using gyroscope data and accelerometer data.

11. A System-on-Chip (SoC) comprising:
a Global Navigation Satellite System (GNSS) receiver configured to:
receive GNSS signals including a line of sight (LOS) signal and at least one multipath signal,
receive, based on previously received GNSS signals, predicted code phase information and predicted Doppler information, and
operate on the GNSS signals within a search space to produce measurements of the GNSS signals across a code phase domain and a Doppler domain of the search space; and
a navigation filter configured to:
define, based on the predicted code phase information and the predicted Doppler information, a LOS region of the search space, the search space including a first set of code phases and Doppler frequencies, the LOS region including a second set of code phases and Doppler frequencies, the second set of code phases and Doppler frequencies being smaller than the first set of code phases and Doppler frequencies,
operate on the produced measurements within the LOS region of the search space to select measurements associated with the LOS signal, and
operate on the selected measurements to produce position or velocity information associated with the LOS signal.

12. The System-on-Chip of claim 11, wherein the GNSS receiver is further configured to use long coherent integration to separate the LOS signal from the at least one multipath signal in the Doppler domain.

13. The System-on-Chip of claim 11, wherein the GNSS receiver is further configured to remove a navigation data bit associated with the GNSS signals.

14. The System-on-Chip of claim 11, wherein the navigation filter is further configured to operate on the produced measurements within the LOS region of the search space to select the measurements associated with the LOS signal based on the predicted code phase information and the predicted Doppler information.

15. The System-on-Chip of claim 11, further comprising:
multiple sensors;
a sensor aid configured to:
estimate biases associated with the multiple sensors, and
generate sensor aiding data with the biases removed; and
a Global Navigation Satellite System (GNSS) sensor integrator configured to operate on the sensor aiding data and the GNSS selected measurements to produce:
sensor-aided position information,
sensor-aided velocity information,
sensor-aided predicted code phase information, or
sensor-aided predicted Doppler information.

16. The System-on-Chip of claim 15, wherein the multiple sensors include at least a gyroscope and an accelerometer.

17. A Global Navigation Satellite System (GNSS) device configured to:
receive GNSS signals including a line of sight (LOS) signal and at least one multipath signal;
generate, based on previously received GNSS signals, predicted code phase information and predicted Doppler information;
define, based on the predicted code phase information and the predicted Doppler information, a LOS region of a search space, the search space having dimensions in a code phase domain and in a Doppler domain, the search space including a first set of code phases and Doppler frequencies, the LOS region including a second set of code phases and Doppler frequencies, the second set of code phases and Doppler frequencies being smaller than the first set of code phases and Doppler frequencies;
operate on the GNSS signals within the search space to produce measurements of the GNSS signals across the code phase domain and the Doppler domain of the search space;
operate on the produced measurements within the LOS region of the search space to select measurements associated with the LOS signal; and
operate on the selected measurements to produce position and/or velocity information associated with the LOS signal.

18. The GNSS device of claim 17, further configured to use long coherent integration to separate the LOS signal from the at least one multipath signal in the Doppler domain and to remove a navigation data bit associated with the GNSS signals.

19. A vehicle embodying the GNSS device of claim 17.

20. The GNSS device of claim 17, further configured to integrate position and/or velocity information with sensor data to produce sensor-aided position and/or velocity information.

* * * * *